J. R. FORDYCE.
COTTON GIN.
APPLICATION FILED APR. 22, 1911.

1,019,240.

Patented Mar. 5, 1912.

Witnesses:
Amelia M. Ross
May A. Hurley.

Inventor:
John R. Fordyce
by Robt. P. Harris
Atty.

COLUMBIA PLANOGRAPH CO., WASHINGTON, D. C.

UNITED STATES PATENT OFFICE.

JOHN R. FORDYCE, OF LITTLE ROCK, ARKANSAS.

COTTON-GIN.

1,019,240. Specification of Letters Patent. Patented Mar. 5, 1912.

Application filed April 22, 1911. Serial No. 622,651.

*To all whom it may concern:*

Be it known that I, JOHN R. FORDYCE, a citizen of the United States, residing at Little Rock, in the county of Pulaski and State of Arkansas, have invented an Improvement in Cotton-Gins, of which the following description, in connection with the accompanying drawings, is a specification, like letters on the drawings representing like parts.

The invention to be hereinafter described relates to cotton gins of the type wherein the separation of the fiber from the seed is effected by means of saws. In machines of this type the reclaimed fiber is liable to be stretched, broken and otherwise injured by the action of the saws in detaching fiber from the seed; and the seed itself has heretofore not been readily discharged after its denudation. Likewise when the saws have taken the fiber from the seed and conveyed it outside of the roll box, various means have been employed to detach the fiber from the saws, but such attempts have been open to more or less objection either by reason of insufficient action or the absence of economic conditions in the use of the means employed.

The means and purposes of the present invention are to provide a cotton gin of the saw type wherein not only is the fiber taken from the seed and maintained in its natural length and unstretched condition, and then effectively removed from the saws, but the seed itself after being denuded, is readily discharged from the machine.

With these general facts in mind, the present invention will best be understood from the following description in connection with the accompanying drawings of one with the accompanying drawings of one form of means for carrying the invention into practical effect, it being understood that the details of the illustrated means may be varied within the true scope of the actual invention as pointed out by the claims.

Figure 1:
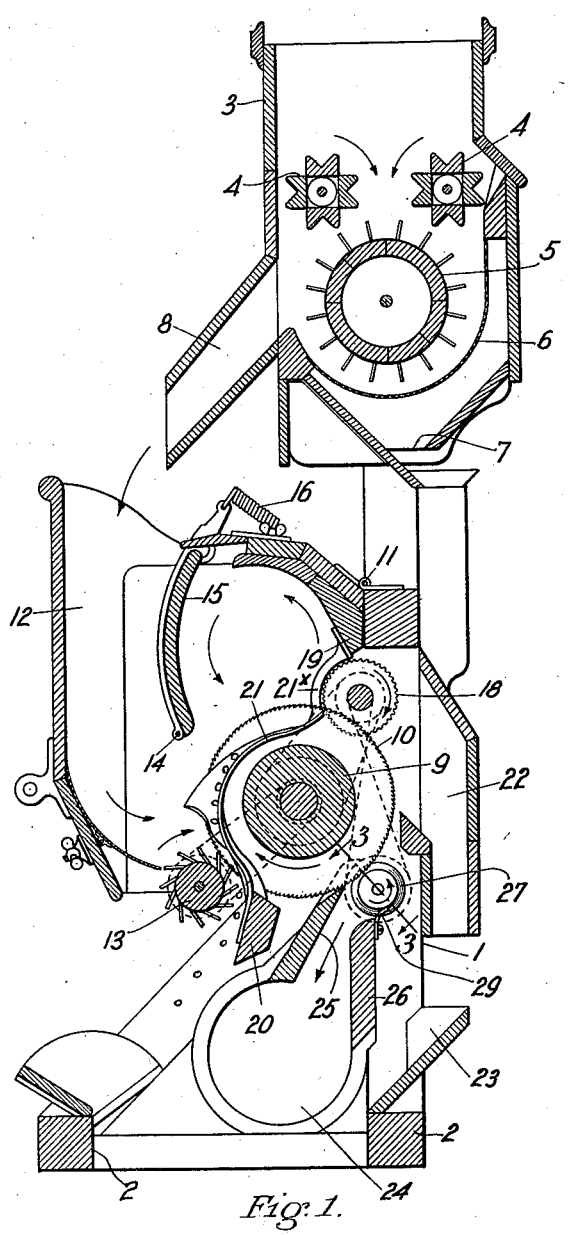
Figure 2:
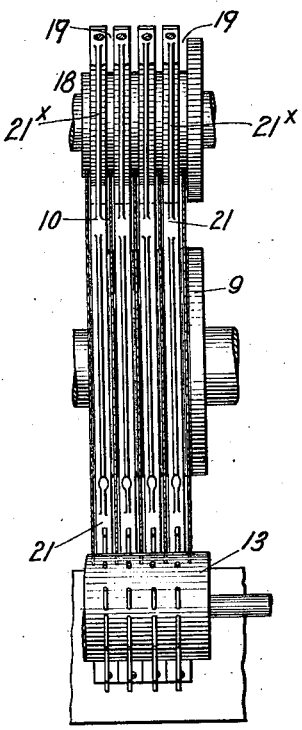
Figure 3:
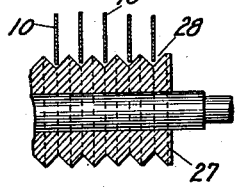
Figure 4:
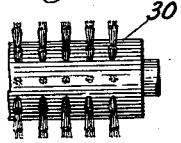

In the drawings: Figure 1 is a central transverse section of a cotton gin embodying the features of the present invention. Fig. 2 is an enlarged detached detail showing the saws, the doffer, the seed conveyers and huller roller. Fig. 3 is a section on the line 3—3 of Fig. 1. Fig. 4 is a modification of the device indicated by Fig. 3.

The frame of the machine is made of any usual or desired character and, as shown, comprises the side portions 1 rising from a suitable base 2, said side portions furnishing suitable supporting means for the operating parts, as will hereinafter appear.

Disposed above the main ginning elements is the feeder 3 in which is rotatively mounted the stirring rolls 4—4 and the agitator 5 which may be driven from any suitable source of power, as will be well understood by those skilled in the art. Below the agitator 5 is a screen 6 through which the trash, usually found in seed cotton, may pass, said trash being conducted through the opening 7 of the feeder and conveyed to a proper receptacle or discharged from the machine. The feeder 3 is provided with a feed spout or other conveyer 8 for directing the seed cotton into the gin proper.

Extending transversely between the side frames of the machine is the ginning roller 9, usually termed the saw cylinder, which is provided with a series of saws 10, said saw cylinder being driven as usual from any suitable source of power and in the direction indicated by the arrow in Fig. 1.

Pivotally mounted to the main frame as at 11 is the receptacle 12 which receives the seed cotton as it is discharged from the feeder 3 through the spout 8. At the lower portion of the receptacle 12 is the huller roller 13 having any usual form of blades for acting upon the seed cotton and directing it to the saws, as will be evident to those skilled in the art.

The parts so far described, except as may hereinafter appear, may be of usual construction.

Pivotally mounted at 14 is the roll presser 15, the upper end of which is under the influence of a spring 16 which normally acts to move the presser 15 about its pivotal point 14 and maintain the roll of seed cotton in the roll box properly pressed toward the saws.

Mounted in coöperative relation with the saw cylinder and saws is the doffer, which in the present form of the invention, comprises a roller having a series of grooves 17, Fig. 2, in each of which grooves works one of the saws of the saw cylinder, the relation of parts being such that seed cotton subjected to the action of the saws will be carried into contact with the peripheral portions of the grooved cylinder and the seed will there be stopped while the saws detach the fiber from the seed, the cylinder itself acting at such times to move the seed upwardly and in the direction of rotative movement of the roll of seed cotton in the roll box, as indicated by the arrows in Fig. 1. The grooved doffing roller, which, for identification may be referred to as a whole by 18, Fig. 1, is so disposed with reference to the projection 19 in the roll box, Fig. 1, that seed cannot follow the grooved roller as it is rotated. The peripheral portions of the grooved roller 18 are preferably indented or corrugated, or provided with other roughened surface in order to more effectively act upon the partially denuded seed to lift and move it in the direction of rotation of the roll in the roll box, it being understood that as the saws pass into the grooves of the doffing roller they perform the entire ginning operation, that is, the detachment of the fiber from the seed and its removal from the roll box while the grooved roller lifts the partially denuded seed and moves it as hereinbefore pointed out.

Secured to the bottom board or bar 20 of the receptacle 12 which is itself hinged at 11 to the machine frame are the seed conveyers 21 which extend upward from the bottom bar 20 between each pair of saws and terminate at their upper ends adjacent the ginning point of the saws and have a fin 21$^\times$ which passes about the periphery of the grooved roller 18, as indicated in Figs. 1 and 2.

The saws 10 of the saw cylinder are separated a sufficient distance apart laterally to permit the denuded seed to pass downward between the saws, whereupon they rest on the lateral flanged portion of the seed conveyers 21 and are directed by said conveyers out of the machine, as indicated in Fig. 1. The lateral dimensions of the grooves 17 in the doffing roller are such that they each accommodate the edge portion of one of the saws, Figs. 1 and 2, and are of such size as to not permit seed to pass into said grooves and be thereby discharged at the upper portion of the machine. In other words, the relation and construction of parts is such that the saws pull the fiber from the seed by passing into the grooves of the grooved doffer, the latter acting upon the seed to move it in the direction of the roll of seed cotton in the roll box, but preventing it from passing out of the machine. When the seed has been properly denuded, it falls between the saws and on to the seed conveyers 21 which, as hereinbefore pointed out, direct the denuded seed at once from the machine.

In order to properly discharge the motes, there is provided at the rear portion of the saws a mote conveyer or chute 22, through which the motes discharged by centrifugal action from the saws may drop into a suitable receptacle 23 at the base of the machine.

The present invention contemplates the provision of an effective device for detaching the fiber from the saws, such device in the present illustration comprising an air suction flue 24, the walls of which may be extended in proximity with the peripheral portions of the saws, as indicated in Fig. 1. In the preferred form of the device the wall 25 of the suction flue may be extended to approximately the position of the peripheries of the saws, or, as indicated by dotted lines in Fig. 1, the wall 25 may be slotted to permit the passage of the saws so that a portion of the wall 25 extends between the saws. The other wall 26 of the suction flue may extend upward toward the saw cylinder and terminate at a convenient distance therefrom for the accommodation of the roller 27. This roller 27 is sustained by suitable supports on the machine frame and extends the length of the saw cylinder, the portions of said roller 27 directly opposite the saws, being recessed as at 28, in order that the edge of the saws may partially enter, as indicated in Fig. 2.

One of the characteristics of the present invention is the employment of suction currents as in the patent to Graber, No. 568,610, dated September 29, 1896 for the removal of the cotton fiber from the saws. In said Graber patent the currents induced by the suction apparatus were concentrated at the upper portion of the saws by suitable inlet devices, but experiments have shown that the device hereinbefore described possesses the advantages of concentrating the induced air currents more effectively around the teeth of the saws, and the rotative movement of the roller 27 in a direction indicated by the arrow, Fig. 1, assists in the directional movement of the induced currents to effectively detach the fiber from the saws. Owing to the peripheral grooved portions of the roller 27 the incoming air currents are directed along the side faces of the saws and concentrated at the point where the saws hold the bunch of fiber previously detached from the seed by them. In order to confine the incoming currents of air to action upon the peripheries of the saws, a shield 29 is secured to the part 26, as indicated in Fig. 1, and bears upon the periphery of the roller 27, thereby preventing air currents from passing under the roller into the exhaust flue and compelling such currents to follow the roller movement in the direction of the arrow which is best calculated to carry the fiber into the mouth of the exhaust flue.

It is sometimes desirable to replace the roller 27 by a brush, such as 30, Fig. 3, which will tend not only to confine the induced air currents to the characteristic action described for the roller 27, but will also tend to comb the fiber somewhat as it is being detached from the teeth of the saws.

While the above constitutes a good practical form of the present invention, it is to be understood that the invention is not circumscribed by the details thereto except as hereinafter pointed out by the claims.

In operation, seed cotton being transferred from the feeder into the receptacle 12 and being subjected to the action of the revolving saws, the fiber will be detached at the co-acting portions of the saws and grooved roller, and be carried outside the roll box, while the grooved doffing roller will move the partially denuded seed into conformity with the movement of the roll of seed cotton in the roll box. As the saws carry the fiber outside the roll box, the motes and other impurities will be thrown from the saws by centrifugal action and directed out of the machine by reason of the mote conveyer 22, while the cotton fiber will be carried by the saws to a point adjacent the opening of the exhaust flue, where the concentrated induced air currents will detach the fiber and carry it away to any point desired.

What is claimed is:

1. In a cotton gin, the combination of a series of saws separated a distance laterally to permit seed to pass between them, a doffer having grooves into which the saws pass in detaching fiber from the seed, a suction device having an inlet adjacent the peripheries of the saws and disposed remote from the doffer to permit motes to be thrown from the saws by centrifugal action, and a seed conveyer extending between the saws to direct seed from the machine.

2. In a cotton gin, the combination of a series of saws, coacting means for detaching fiber from the seed, air suction means to take the cotton from the saws, and a rotary device interposed between the saws and suction means, said suction means being disposed remote from the point where the saws detach the fiber from the seed to permit the saws to discharge the motes separate from the fiber.

3. In a cotton gin, the combination of a series of saws, a rotary doffer coacting with the saws to detach fiber from the seed, and a suction flue having an opening adjacent the peripheries of the saws to take the fiber from the saws, said doffer and suction opening being separated a distance to permit motes to be thrown from the saws before reaching the suction opening.

4. In a cotton gin, the combination of a series of saws, a rotary doffer coacting with the saws to detach fiber from the seed, a suction flue having an opening adjacent the peripheries of the saws to take the fiber from the saws, and a mote conveyer disposed between the doffer and opening of the suction flue.

5. In a saw gin, the combination of a series of saws, a grooved doffing roller coacting therewith to detach the fiber from the seed, and a suction flue having a roller adjacent the peripheries of the saws.

6. In a cotton gin, the combination of a series of saws and coacting means for detaching the fiber from the seed, an air suction flue for carrying the fiber from the saws, and a roller disposed adjacent the inlet of the suction flue.

7. In a cotton gin, the combination of a series of saws and coacting means for detaching the fiber from the seed, an air suction flue for carrying the fiber from the saws, a roller disposed adjacent the inlet of the suction flue, and having peripheral indents for the saws.

8. In a cotton gin, the combination of a series of saws, and coacting means for detaching fiber from the seed, an air suction flue, and a rotary device interposed between the suction flue and saws.

9. In a cotton gin, the combination of a series of saws, and coacting means for detaching fiber from the seed, a mote receiver to catch motes discharged from the saws, an air suction flue below the said receiver, and a rotary device interposed between the saws and the suction flue.

10. In a cotton gin, the combination of a series of saws, and coacting means for detaching fiber from the seed, a mote receiver to catch motes discharged from the saws, an air suction flue below the said receiver, and a roller having peripheral grooves into which the saws project, said roller being disposed adjacent the inlet to the suction flue.

In testimony whereof, I have signed my name to this specification, in the presence of two subscribing witnesses.

JOHN R. FORDYCE.

Witnesses:
R. E. BISHOP,
JOE SCHMELZER.

Copies of this patent may be obtained for five cents each, by addressing the "Commissioner of Patents, Washington, D. C."